(12) United States Patent
Ogura et al.

(10) Patent No.: US 12,071,123 B2
(45) Date of Patent: Aug. 27, 2024

(54) VEHICLE CONTROL DEVICE

(71) Applicant: HONDA MOTOR CO., LTD., Tokyo (JP)

(72) Inventors: Futoshi Ogura, Tokyo (JP); Naoki Fujishiro, Tokyo (JP); Takanori Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 17/893,702

(22) Filed: Aug. 23, 2022

(65) Prior Publication Data
US 2023/0067041 A1 Mar. 2, 2023

(30) Foreign Application Priority Data

Aug. 26, 2021 (JP) ................................. 2021-138410

(51) Int. Cl.
*B60W 20/13* (2016.01)
*B60W 10/06* (2006.01)
*B60W 10/08* (2006.01)
*B60W 10/18* (2012.01)
(Continued)

(52) U.S. Cl.
CPC ............ *B60W 20/13* (2016.01); *B60W 10/06* (2013.01); *B60W 10/08* (2013.01); *B60W 20/12* (2016.01); *B60W 50/14* (2013.01); *B60W 2050/146* (2013.01); *B60W 2510/244* (2013.01); *B60W 2520/10* (2013.01); *B60W 2552/15* (2020.02); *B60W 2710/06* (2013.01); *B60W 2710/08* (2013.01); *B60W 2710/244* (2013.01)

(58) Field of Classification Search
CPC ...... B60W 20/13; B60W 10/06; B60W 10/08; B60W 20/12; B60W 50/14; B60W 2050/146; B60W 2510/244; B60W 2520/10; B60W 2710/06; B60W 2710/244; B60K 35/28; B60K 35/00; B60K 2360/169
See application file for complete search history.

(56) References Cited

U.S. PATENT DOCUMENTS 9,050,975 B2 * 6/2015 Fushiki ................. B60W 10/06
10,864,794 B2 * 12/2020 Lee ..................... B60H 1/00771
(Continued)

FOREIGN PATENT DOCUMENTS

JP 2010-221853 A 10/2010

*Primary Examiner* — Mussa A Shaawat
(74) *Attorney, Agent, or Firm* — Paratus Law Group, PLLC

(57) ABSTRACT

A vehicle control device is configured to cause a vehicle to travel in a first mode when an enlargement mode is set, a driving force required for traveling of the vehicle is less than a value, and a capacity of a power storage is equal to or more than a first threshold, operate an internal combustion engine to cause the vehicle to travel in a second mode in response to the driving force becoming equal to or larger than the value when the enlargement mode is set and the vehicle is caused to travel in the first mode, and continue the enlargement mode when the capacity at a time when the driving force becomes equal to or more than the value is equal to or larger than a second threshold larger than the first threshold, and cancel the enlargement mode when the capacity is less than the second threshold.

7 Claims, 7 Drawing Sheets

(51) Int. Cl.
 *B60W 20/12* (2016.01)
 *B60W 50/14* (2020.01)

(56) References Cited

U.S. PATENT DOCUMENTS

| | | | | |
|---|---|---|---|---|
| 2005/0003925 | A1* | 1/2005 | Wakashiro | B60W 20/13 903/917 |
| 2008/0040015 | A1* | 2/2008 | Fujishiro | B60L 50/16 701/99 |
| 2008/0071437 | A1* | 3/2008 | Hirata | B60W 10/08 701/22 |
| 2008/0303471 | A1* | 12/2008 | Fujishiro | H02K 21/029 318/563 |
| 2009/0096307 | A1* | 4/2009 | Tsutsumi | B60W 10/06 903/930 |
| 2009/0319107 | A1* | 12/2009 | Soma | B60W 10/06 180/65.21 |
| 2011/0022259 | A1* | 1/2011 | Niwa | G01C 21/3415 903/903 |
| 2013/0024061 | A1* | 1/2013 | Yagura | B60W 10/26 180/65.265 |
| 2013/0060409 | A1* | 3/2013 | Matsushita | B60W 10/184 180/65.23 |
| 2014/0039744 | A1* | 2/2014 | Morisaki | B60W 20/13 903/903 |
| 2014/0067179 | A1* | 3/2014 | Amano | B60W 10/08 180/65.265 |
| 2014/0180521 | A1* | 6/2014 | Tsuchikawa | B60K 6/46 180/65.265 |
| 2014/0365057 | A1* | 12/2014 | Arita | F02D 29/02 903/903 |
| 2015/0073673 | A1* | 3/2015 | Hata | F16D 48/06 701/68 |
| 2015/0224981 | A1* | 8/2015 | Fujishiro | B60L 7/18 180/65.265 |
| 2015/0246591 | A1* | 9/2015 | Ono | B60W 10/08 180/65.265 |
| 2015/0274016 | A1* | 10/2015 | Kinoshita | B60R 1/27 701/36 |
| 2015/0362730 | A1* | 12/2015 | Emura | G06V 20/58 345/87 |
| 2016/0186674 | A1* | 6/2016 | Umesaka | F02D 29/02 701/22 |
| 2016/0251010 | A1* | 9/2016 | Hata | B60W 10/26 701/22 |
| 2016/0257300 | A1* | 9/2016 | Hata | B60W 20/40 |
| 2016/0312885 | A1* | 10/2016 | Kuwahara | F16H 61/0437 |
| 2016/0368479 | A1* | 12/2016 | Kim | B60W 10/06 |
| 2018/0201116 | A1* | 7/2018 | Miyagawa | B60K 6/547 |
| 2018/0334157 | A1* | 11/2018 | Tanaka | B60W 10/06 |
| 2019/0359050 | A1* | 11/2019 | Komuro | B60L 50/16 |
| 2019/0390970 | A1* | 12/2019 | Cha | B60W 20/00 |
| 2020/0247266 | A1* | 8/2020 | Sakata | B60L 15/20 |
| 2021/0031748 | A1* | 2/2021 | Watanabe | B60W 10/30 |
| 2021/0129828 | A1* | 5/2021 | Bruhn | B60W 50/04 |
| 2021/0372810 | A1* | 12/2021 | Hato | G09G 5/38 |
| 2022/0041154 | A1* | 2/2022 | Hoshi | B60W 20/13 |
| 2022/0153253 | A1* | 5/2022 | Nakashima | B60W 10/02 |

* cited by examiner

VEHICLE CONTROL DEVICE

CROSS-REFERENCE TO RELATED APPLICATIONS

This application is based on and claims priority under 35 USC 119 from Japanese Patent Application No. 2021-138410 filed on Aug. 26, 2021, the contents of which are incorporated herein by reference.

TECHNICAL FIELD

The present disclosure relates to a vehicle control device that controls a vehicle.

BACKGROUND

In recent years, as a specific measure against global climate change, efforts toward realization of a low-carbon society or a decarbonized society have become active. Also in vehicles, a reduction in a $CO_2$ emission is strongly required, and a drive source is rapidly electrified. Specifically, a vehicle (hereinafter, also referred to as an "electric vehicle") including an electric motor as a drive source and a battery as a power source capable of supplying electric power to the electric motor, such as an electrical vehicle or a hybrid electrical vehicle, has been developed.

JP-A-2010-221853 (hereinafter, referred to as Patent Literature 1) discloses a technique in which a vehicle is capable of switching between an EV mode in which the vehicle travels by a driving force of only a motor and a HEV mode in which the vehicle travels by driving the motor and an engine. When the vehicle travels in the HEV mode and an accelerator opening degree remains in a hysteresis region between an engine start line and an engine stop line for more than a preset transition set time, an EV time transition process of transitioning to the EV mode is executed to increase a traveling frequency in the EV mode.

There are vehicles that include an internal combustion engine, a power storage device, an electric motor that performs driving according to supply of electric power from at least the power storage device, and a drive wheel that is driven by at least one of the internal combustion engine and the electric motor. The vehicles can take a first traveling mode in which the vehicles travel by stopping an operation of the internal combustion engine and driving the drive wheel by the electric motor according to supply of electric power from the power storage device. In some of the vehicles, an enlargement mode for increasing the traveling frequency by the first traveling mode can be set according to a request from a vehicle user. However, in the related art, there is room for improvement from a viewpoint of appropriately continuing such an enlargement mode.

The present disclosure provides a vehicle control device capable of appropriately continuing an enlargement mode and capable of improving marketability of a vehicle.

SUMMARY

A vehicle control device, in which
the vehicle control device is configured to control a vehicle comprising an internal combustion engine, a power storage device, an electric motor that performs driving according to supply of electric power from at least the power storage device, and a drive wheel that is driven by at least one of the internal combustion engine and the electric motor,
the vehicle has a first traveling mode in which the vehicle travels by stopping an operation of the internal combustion engine and driving the drive wheel by the electric motor according to supply of electric power from the power storage device, and a second traveling mode in which the vehicle travels by operating the internal combustion engine,
the vehicle control device is configured to
set an enlargement mode for increasing a traveling frequency in the first traveling mode in response to a request from a user of the vehicle,
cause the vehicle to travel in the first traveling mode under a condition that the enlargement mode is set, a required driving force required for traveling of the vehicle is smaller than a predetermined value, and a remaining capacity of the power storage device is equal to or more than a predetermined enlargement mode lower threshold,
operate the internal combustion engine to cause the vehicle to travel in the second traveling mode in response to the required driving force becoming equal to or larger than the predetermined value under a condition that the enlargement mode is set and the vehicle is caused to travel in the first traveling mode, and
continue the enlargement mode under a condition that the remaining capacity at a time when the required driving force becomes equal to or larger than the predetermined value is equal to or more than a predetermined hold lower threshold, and cancel the enlargement mode under a condition that the remaining capacity is less than the hold lower threshold, and
the hold lower threshold is larger than the enlargement mode lower threshold.

According to the present disclosure, it is possible to provide a vehicle control device capable of appropriately continuing an enlargement mode and improving marketability of a vehicle.

BRIEF DESCRIPTION OF DRAWINGS

Exemplary embodiments of the present disclosure will be described in detail based on the following figures, wherein.

DESCRIPTION OF EMBODIMENTS

Hereinafter, an embodiment of a vehicle control device according to the present disclosure will be described in detail with reference to the drawings.

[Vehicle]

First, a vehicle including a control device according to an embodiment of a vehicle control device of the present disclosure will be described.

Figure 1:
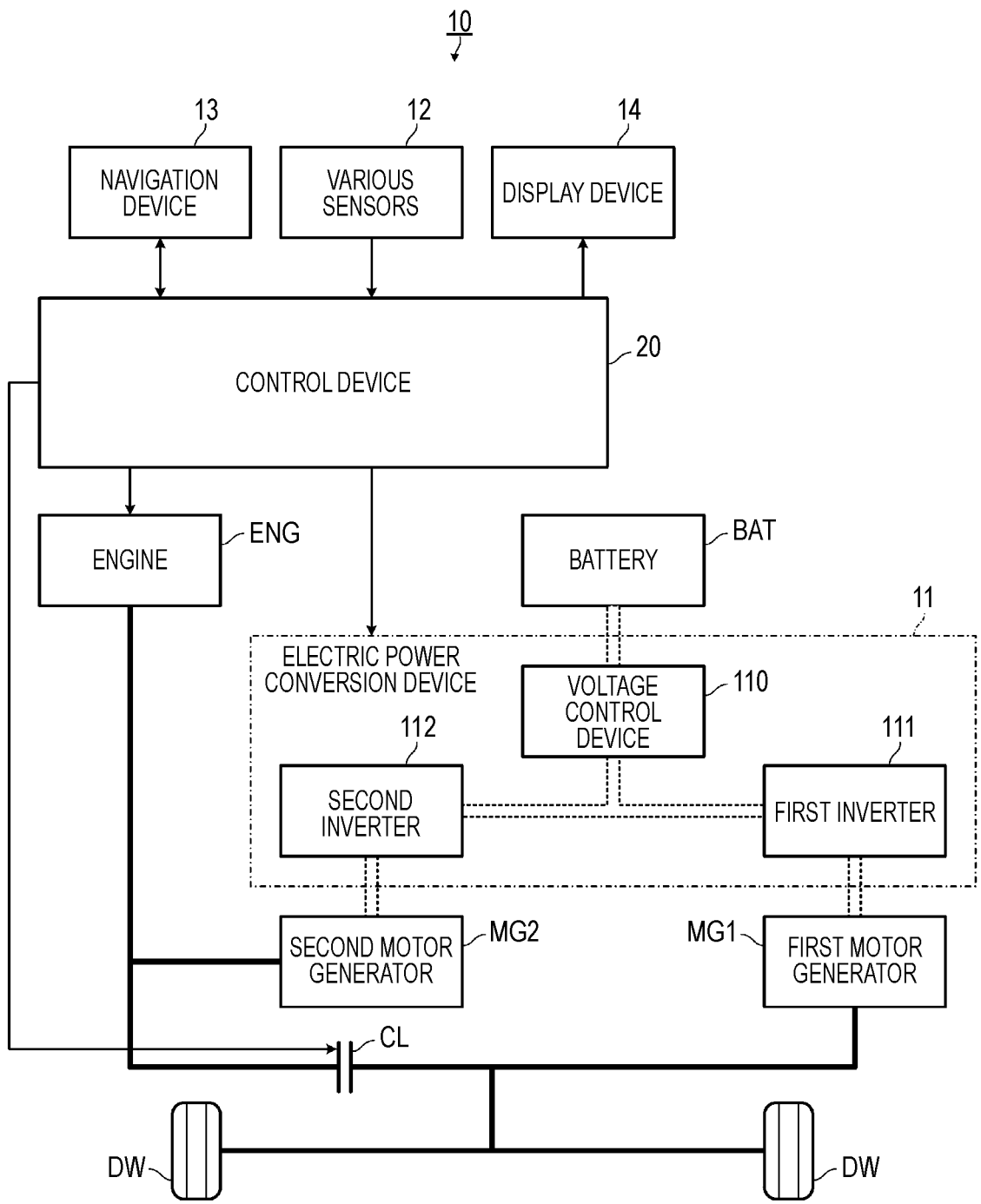
FIG. 1 shows a schematic configuration of a vehicle 10 according to an embodiment.

As shown in FIG. 1, a vehicle 10 of the present embodiment is a hybrid electric vehicle, and includes an engine ENG which is an example of an internal combustion engine, a first motor generator MG1 which is an example of an electric motor, a second motor generator MG2 which is an example of a generator, a battery BAT which is an example of a power storage device, a clutch CL, an electric power conversion device 11, various sensors 12, a navigation device 13, a display device 14, and a control device 20 which is an example of the vehicle control device. In FIG. 1, a thick solid line indicates mechanical connection, a double dotted line indicates electrical wiring, and a thin solid line arrow indicates transmission and reception of a control signal or a detection signal.

The engine ENG is, for example, a gasoline engine or a diesel engine, and outputs power generated by burning supplied fuel. The engine ENG is coupled to the second motor generator MG2 and is coupled to a drive wheel DW of the vehicle 10 via the clutch CL. Power output from the engine ENG (hereinafter, also referred to as "output of the engine ENG") is transmitted to the second motor generator MG2 when the clutch CL is in a disconnected state, and is transmitted to the second motor generator MG2 and the drive wheel DW when the clutch CL is in a connected state (engaged state). The second motor generator MG2 and the clutch CL will be described later.

The first motor generator MG1 is a motor generator (traction motor) mainly used as a drive source of the vehicle 10, and includes, for example, an alternating current motor. The first motor generator MG1 is electrically connected to the battery BAT and the second motor generator MG2 via the electric power conversion device 11. The electric power of at least one of the battery BAT and the second motor generator MG2 may be supplied to the first motor generator MG1. The first motor generator MG1 operates as an electric motor by being supplied with electric power, and outputs power for the vehicle 10 to travel. The first motor generator MG1 is coupled to the drive wheel DW, and power output from the first motor generator MG1 (hereinafter, also referred to as "output of the first motor generator MG1") is transmitted to the drive wheel DW. The vehicle 10 travels by transmitting at least one of the output of the engine ENG and the output of the first motor generator MG1 to the drive wheel DW.

In addition, the first motor generator MG1 performs a regenerative operation as a generator when the vehicle 10 is braked (when the vehicle 10 is rotated by the engine ENG or the drive wheel DW) to generate electric power (regenerative power generation). Electric power (hereinafter, also referred to as "regenerative electric power") generated by the regenerative operation of the first motor generator MG1 is supplied to the battery BAT via the electric power conversion device 11, for example. Accordingly, the battery BAT can be charged by the regenerative electric power.

The regenerative electric power may not be supplied to the battery BAT, and may be supplied to the second motor generator MG2 via the electric power conversion device 11. By supplying the regenerative electric power to the second motor generator MG2, it is possible to perform "waste electricity" in which the regenerative electric power is consumed without charging the battery BAT. At the time of waste electricity, the regenerative electric power supplied to the second motor generator MG2 is used for driving the second motor generator MG2, and power generated thereby is input to the engine ENG to be consumed by mechanical friction loss of the engine ENG and the like.

The second motor generator MG2 is a motor generator mainly used as a power generator, and includes, for example, an alternating current motor. The second motor generator MG2 is driven by the power of the engine ENG to generate electric power. The electric power generated by the second motor generator MG2 is supplied to at least one of the battery BAT and the first motor generator MG1 via the electric power conversion device 11. By supplying the electric power generated by the second motor generator MG2 to the battery BAT, the battery BAT can be charged by the electric power. In addition, by supplying the electric power generated by the second motor generator MG2 to the first motor generator MG1, the first motor generator MG1 can be driven by the electric power.

The electric power conversion device 11 is a device (also referred to as a power control unit "PCU") that converts input electric power and outputs the converted electric power, and is connected to the first motor generator MG1, the second motor generator MG2, and the battery BAT. For example, the electric power conversion device 11 includes a first inverter 111, a second inverter 112, and a voltage control device 110. The first inverter 111, the second inverter 112, and the voltage control device 110 are electrically connected to each other.

The voltage control device 110 converts an input voltage and outputs the converted voltage. A DC/DC converter or the like can be used as the voltage control device 110. For example, when the electric power of the battery BAT is supplied to the first motor generator MG1, the voltage control device 110 boosts an output voltage of the battery BAT and outputs the boosted output voltage to the first inverter 111. For example, when the regenerative power generation is performed by the first motor generator MG1, the voltage control device 110 steps down an output voltage of the first motor generator MG1 received via the first inverter 111 and outputs the stepped-down output voltage to the battery BAT. When electric power is generated by the second motor generator MG2, the voltage control device 110 steps down an output voltage of the second motor generator MG2 received via the second inverter 112 and outputs the stepped-down output voltage to the battery BAT.

When the electric power of the battery BAT is supplied to the first motor generator MG1, the first inverter 111 converts the electric power (direct current) of the battery BAT received via the voltage control device 110 into an alternating current and outputs the alternating current to the first motor generator MG1. When the first motor generator MG1 performs the regenerative power generation, the first inverter 111 converts the electric power (alternating current) received from the first motor generator MG1 into a direct current and outputs the direct current to the voltage control device 110. When the regenerative electric power of the first motor generator MG1 is wasted, the first inverter 111 converts the electric power (alternating current) received from the first motor generator MG1 into a direct current and outputs the direct current to the second inverter 112.

When electric power is generated by the second motor generator MG2, the second inverter 112 converts the electric power (alternating current) received from the second motor generator MG2 into a direct current and outputs the direct current to the voltage control device 110. When the regenerative electric power of the first motor generator MG1 is wasted, the second inverter 112 converts the regenerative electric power (direct current) of the first motor generator MG1 received via the first inverter 111 into an alternating current and outputs the alternating current to the second motor generator MG2.

The battery BAT is a chargeable and dischargeable secondary battery, and includes a plurality of power storage cells connected in series or in series and parallel. The battery BAT may be configured to output a high voltage of, for example, 100 [V] to 400 [V]. As the power storage cell of the battery BAT, a lithium ion battery, a nickel hydrogen battery, or the like can be used.

The clutch CL can take a connected state in which a power transmission path from the engine ENG to the drive wheel DW is connected (engaged), and a disconnected state in which the power transmission path from the engine ENG to the drive wheel DW is disconnected (blocked). The output of the engine ENG is transmitted to the drive wheel DW when the clutch CL is in the connected state, and is not transmitted to the drive wheel DW when the clutch CL is in the disconnected state.

The various sensors 12 include, for example, a vehicle speed sensor that detects a traveling speed of the vehicle 10 (hereinafter, also referred to as a "vehicle speed"), an accelerator position (hereinafter, also referred to as an "AP") sensor that detects an operation amount of the vehicle 10 with respect to an accelerator pedal, and a battery sensor that detects various types of information on the battery BAT (for example, the output voltage of the battery BAT, a charge and discharge current, and temperature). Detection results of the various sensors 12 are transmitted to the control device 20 as detection signals.

The navigation device 13 includes a storage device (for example, a flash memory) that stores map data and the like, a global navigation satellite system (GNSS) receiver that can specify a position of the vehicle 10 (hereinafter, also referred to as a "host vehicle position") based on a signal received from a positioning satellite, a display that displays various types of information, an operation button (including a touch panel) that receives an operation from a user (an occupant of the vehicle 10, for example, a driver; the same applies to the following description), and the like.

The map data stored in the navigation device 13 includes road data related to a road. For example, in the road data, each road is divided into predetermined sections. The road data includes information on links corresponding to the sections and nodes connecting the links. In the road data, attribute information indicating a distance of a section corresponding to each link, a regulated speed (for example, a legal speed), a road gradient (for example, an inclination angle), and the like is provided in association with each link.

For example, the navigation device 13 determines a route (hereinafter, also referred to as a "guidance route") from the host vehicle position, which is the current location of the vehicle 10, to a destination set by the user of the vehicle 10 with reference to map data or the like, and guides the user by displaying the determined guidance route on a display.

The navigation device 13 predicts a scheduled traveling route of the vehicle 10 with reference to the host vehicle position, a traveling direction of the vehicle 10, the set destination, the map data, and the like. As an example, the navigation device 13 predicts a section (for example, a section from the host vehicle position to 10 [km] ahead in the traveling direction) within a predetermined range ahead of (that is, in front of) the traveling direction of the vehicle 10 from the host vehicle position as the scheduled traveling route.

When the scheduled traveling route is predicted, the navigation device 13 transmits route information on the scheduled traveling route to the control device 20. The route information includes information indicating each section included in the scheduled traveling route and the attribute information of each section. Accordingly, the navigation device 13 can notify the control device 20 of each section included in the scheduled traveling route, and the regulated speed, the road gradient, and the like of the section. In addition, the navigation device 13 also notifies the control device 20 of the host vehicle position as appropriate.

Further, the navigation device 13 may be configured to receive road traffic information including congestion information, and may transmit the received road traffic information to the control device 20. In this way, the navigation device 13 can notify the control device 20 of a congestion situation or the like of the scheduled traveling route.

The display device 14 is a display device capable of displaying various types of information related to the vehicle 10, and is, for example, a liquid crystal display called a "multi-information display". The information displayed by the display device 14 includes information indicating a remaining capacity of the battery BAT (hereinafter, also referred to as "remaining capacity information"). In the present embodiment, the remaining capacity information roughly indicates the amount of remaining capacity of the battery BAT in several stages (for example, 10 stages) (see FIGS. 7 and 8 to be described later). Therefore, the user can roughly know the remaining capacity of the battery BAT at that time by checking the remaining capacity information displayed on the display device 14. The display device 14 is not limited to a liquid crystal display, and may be a lamp display or the like.

The control device 20 is a device (computer) that is implemented by, for example, an electronic control unit (ECU) including a processor that performs various calculations, a storage device that stores various types of information, an input and output device that controls input and output of data between the inside and the outside of the control device 20, and the like, and performs overall control of the entire vehicle 10. The control device 20 may be implemented by one ECU or may be implemented by a plurality of ECUs.

Specifically, the control device 20 is provided so as to communicate with the engine ENG, the clutch CL, the electric power conversion device 11, the various sensors 12, the navigation device 13, and the display device 14. The control device 20 controls the output of the engine ENG, controls the output of the first motor generator MG1 and the second motor generator MG2 by controlling the electric power conversion device 11, and controls a state of the clutch CL. Accordingly, the control device 20 can control a traveling mode of the vehicle 10 as described later. The control device 20 also controls the display device 14 to display the remaining capacity information corresponding to the remaining capacity of the battery BAT at that time on the display device 14.

[Traveling Mode of Vehicle]

Next, the traveling mode of the vehicle 10 will be described. The vehicle 10 can take an EV traveling mode, a hybrid traveling mode, and an engine traveling mode as the traveling modes. The vehicle 10 travels in any one of the traveling modes. Which traveling mode the vehicle 10 travels in is controlled by the control device 20.

[EV Traveling Mode]

The EV traveling mode is a traveling mode in which only the electric power of the battery BAT is supplied to the first motor generator MG1 and the vehicle 10 travels by the power output from the first motor generator MG1 in accordance with the electric power. The EV traveling mode is an example of a first traveling mode according to the present disclosure.

Specifically, in a case of the EV traveling mode, the control device 20 brings the clutch CL into the disconnected state. In addition, in the case of the EV traveling mode, the control device 20 stops the supply of the fuel to the engine ENG, and stops the output of the power from the engine ENG (hereinafter, also referred to as an "operation of the engine ENG"). Therefore, in the EV traveling mode, power generation by the second motor generator MG2 is not performed. In the case of the EV traveling mode, the control device 20 performs a control so that only the electric power of the battery BAT is supplied to the first motor generator MG1, and the first motor generator MG1 outputs power corresponding to the electric power to cause the vehicle 10 to travel by the power.

The control device 20 performs a control so that the vehicle 10 travels in the EV traveling mode, for example, on a condition that only the electric power from the battery BAT is supplied to the first motor generator MG1 and the driving force required for the travel of the vehicle 10 (hereinafter, also referred to as a "required driving force") is obtained by the power output from the first motor generator MG1 in accordance with the electric power.

In the EV traveling mode, since the supply of the fuel to the engine ENG is stopped, the fuel consumed by the engine ENG is reduced and a fuel efficiency of the vehicle 10 is improved as compared with the other traveling modes in which the fuel is supplied to the engine ENG. Therefore, it is possible to improve the fuel efficiency of the vehicle 10 by increasing a frequency (opportunity) of setting the vehicle 10 in the EV traveling mode. Further, in the EV traveling mode, since the second motor generator MG2 does not generate electric power, and the first motor generator MG1 is driven only by the electric power of the battery BAT, the remaining capacity (also called state of charge (SOC)) of the battery BAT tends to decrease.

[Hybrid Traveling Mode]

The hybrid traveling mode is a traveling mode in which at least electric power generated by the second motor generator MG2 is supplied to the first motor generator MG1, and the vehicle 10 is mainly caused to travel by the power output from the first motor generator MG1 in accordance with the electric power. This hybrid traveling mode is an example of a second traveling mode in the present disclosure.

Specifically, in a case of the hybrid traveling mode, the control device 20 brings the clutch CL into the disconnected state. In addition, in the case of the hybrid traveling mode, the control device 20 performs a control so that the fuel is supplied to the engine ENG, and the engine ENG outputs the power to drive the second motor generator MG2 by the power of the engine ENG. Accordingly, in the hybrid traveling mode, the electric power is generated by the second motor generator MG2. In the case of the hybrid traveling mode, the control device 20 performs a control so that the power transmission path is in the disconnected state by the clutch CL, the electric power generated by the second motor generator MG2 is supplied to the first motor generator MG1, and the first motor generator MG1 outputs power corresponding to the electric power to cause the vehicle 10 to travel by the power.

The electric power supplied from the second motor generator MG2 to the first motor generator MG1 is larger than the electric power supplied from the battery BAT to the first motor generator MG1. Therefore, in the hybrid traveling mode, as compared with the EV traveling mode, the output of the first motor generator MG1 can be increased, and a large driving force can be obtained as a driving force (hereinafter, also referred to as "output of the vehicle 10") for causing the vehicle 10 to travel.

In the case of the hybrid traveling mode, the control device 20 may also cause the electric power of the battery BAT to be supplied to the first motor generator MG1 as necessary. That is, in the hybrid traveling mode, the control device 20 may also cause the electric power of both the second motor generator MG2 and the battery BAT to be supplied to the first motor generator MG1. Accordingly, as compared with the case where only the electric power of the second motor generator MG2 is supplied to the first motor generator MG1, the electric power supplied to the first motor generator MG1 can be increased, and a larger driving force can be obtained as the output of the vehicle 10.

[Engine Traveling Mode]

The engine traveling mode is a traveling mode in which the vehicle 10 is mainly caused to travel by the power output from the engine ENG. The engine traveling mode is another example of the second traveling mode according to the present disclosure.

Specifically, in a case of the engine traveling mode, the control device 20 brings the clutch CL into the connected state. In the case of the engine traveling mode, the control device 20 performs a control so that the fuel is supplied to the engine ENG, and the power is output from the engine ENG. In the case of the engine traveling mode, since the power transmission path is in the connected state by the clutch CL, the power of the engine ENG is transmitted to the drive wheel DW to drive the drive wheel DW. As described above, in the case of the engine traveling mode, the control device 20 performs a control so that the power is output from the engine ENG, and the vehicle 10 is caused to travel by the power.

In the case of the engine traveling mode, the control device 20 may also cause the electric power of the battery BAT to be supplied to the first motor generator MG1 as necessary. Accordingly, in the engine traveling mode, the vehicle 10 can be caused to travel by the power output from the first motor generator MG1 by supplying the electric power of the battery BAT, and a larger driving force can be obtained as the output of the vehicle 10 as compared with the case where the vehicle 10 is caused to travel only by the power of the engine ENG. Accordingly, the output of the engine ENG can be prevented and the fuel efficiency of the vehicle 10 can be improved as compared with the case where the vehicle 10 is caused to travel only by the power of the engine ENG.

[Control Mode Related to EV Traveling Mode]

Next, a control mode (hereinafter, also simply referred to as a "control mode") related to the EV traveling mode in the vehicle 10 will be described. The vehicle 10 can take, as the control mode, a normal mode and an EV enlargement mode in which the traveling frequency in the EV traveling mode is higher than that in the normal mode. The EV enlargement mode is an example of an enlargement mode in the present disclosure.

For example, the vehicle 10 is provided with an operation button (not shown, hereinafter, also referred to as an "EV enlargement mode setting button") for setting the control mode to the EV enlargement mode. By operating the EV enlargement mode setting button, the user can request the control device 20 to set the EV enlargement mode (hereinafter, also referred to as an "EV enlargement request"). In response to the EV enlargement request, the control device 20 sets the control mode to the EV enlargement mode. In contrast, when there is no EV enlargement request, the control device 20 sets the control mode to the normal mode.

When the control mode is the EV enlargement mode, the control device 20 enables traveling in the EV traveling mode on condition that the remaining capacity of the battery BAT is equal to or more than a predetermined EV enlargement mode lower threshold. Specifically, when the control mode is the EV enlargement mode, the control device 20 causes the vehicle 10 to travel in the EV traveling mode if the required driving force of the vehicle 10 is less than a predetermined EV cancellation output threshold and the remaining capacity of the battery BAT is equal to or more than the EV enlargement mode lower threshold.

As the EV cancellation output threshold, a value corresponding to an upper limit value of the power that can be output by the first motor generator MG1 according to supply of electric power from only the battery BAT is set. As the EV enlargement mode lower threshold, a value is set so that the battery BAT is not brought into an over-discharged state.

As will be described in detail later, in the EV enlargement mode, the vehicle can travel in the EV traveling mode even in a state in which the remaining capacity of the battery BAT is less than that in the normal mode. Thus, in the EV enlargement mode, the traveling frequency in the EV traveling mode is higher than that in the normal mode.

After the EV enlargement mode is set, the control device 20 cancels the EV enlargement mode at a predetermined timing and returns the control mode to the normal mode even if the user does not perform a predetermined cancellation operation using the EV enlargement mode setting button or the like. Accordingly, even when the user forgets to perform the cancellation operation or does not know how to perform the release operation, the control device 20 automatically returns the control mode to the normal mode, and the EV enlargement mode in which a load on the battery BAT is large is prevented from being continued for a long period of time against an intention of the user.

On the other hand, when the EV enlargement mode is automatically and frequently cancelled, a user who desires to continue the EV enlargement mode requires troublesome work of resetting to the EV enlargement mode each time. Such troublesome work may lead to dissatisfaction of the user with respect to the vehicle 10, and may cause a decrease in the marketability of the vehicle 10. Therefore, the control device 20 can appropriately continue the EV enlargement mode by performing the following control, and improves the marketability of the vehicle 10.

[Example of Case where EV Enlargement Mode is Continued]

First, an example of a case where the EV enlargement mode is continued will be described with reference to FIG. 2. In FIG. 2A, a horizontal axis represents time, and a vertical axis represents a required driving force (that is, driving force required for traveling of the vehicle 10). In FIG. 2B, a horizontal axis represents time, and a vertical axis represents a remaining capacity of the battery BAT. Further, FIG. 2C represents a control mode at each time, and FIG. 2D represents a traveling mode at each time.

Figure 2:
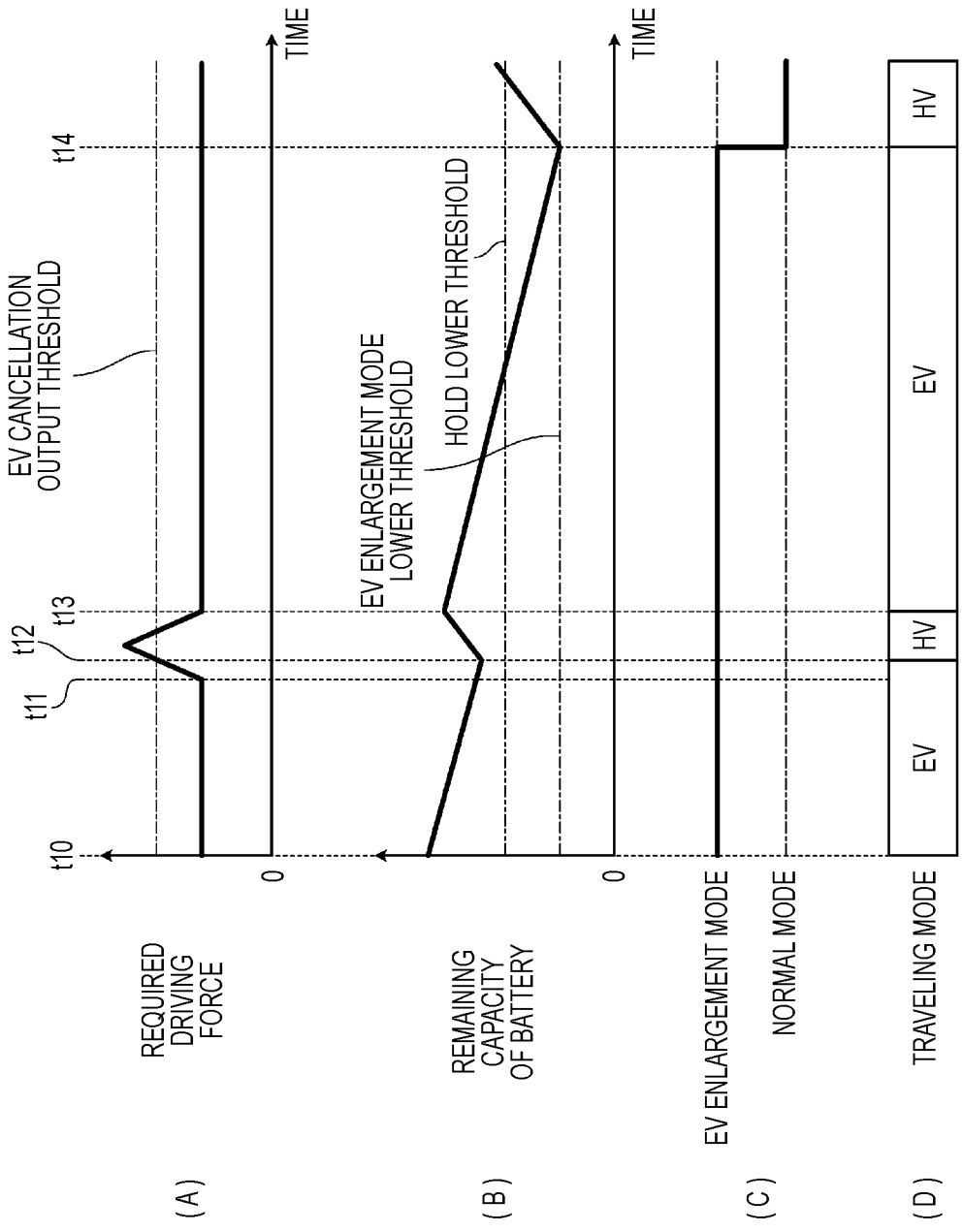
FIG. 2 shows an example of a case where a control device 20 that controls the vehicle 10 continues an EV enlargement mode.

As shown in FIG. 2, at time t110, the control mode is set to the EV enlargement mode. In a period from the time t10 to time t11, the required driving force is substantially constant at a predetermined value less than the EV cancellation output threshold, the remaining capacity of the battery BAT is gradually decreasing but remains in a state of being equal to or more than the EV enlargement mode lower threshold, and thus the control device 20 causes the vehicle 10 to travel in the EV traveling mode (shown as a traveling mode "EV").

The required driving force increases from time t11 by strongly depressing the accelerator pedal of the vehicle 10 or the like, and the required driving force is equal to or larger than the EV cancellation output threshold at time t12 after the time t11. In this way, when the required driving force exceeds the EV cancellation output threshold, the control device 20 operates the engine ENG (that is, ends the EV traveling mode) to switch to the other traveling modes in which the output of the vehicle 10 corresponding to the required driving force can be secured. Here, as an example, it is assumed that the traveling mode is switched to the hybrid traveling mode (shown as a traveling mode "HV"). By switching to the hybrid traveling mode, the battery BAT can be charged by the electric power generated by the second motor generator MG2 driven by the engine ENG.

Further, when the engine ENG is operated due to the required driving force exceeding the EV cancellation output threshold, based on the remaining capacity of the battery BAT at this time, the control device 20 determines whether to continue the EV enlargement mode even after the operation of the engine ENG (that is, after the end of the EV traveling mode). In the determination, the control device 20 determines to continue the EV enlargement mode when the remaining capacity of the battery BAT is equal to or more than a predetermined hold lower threshold, and determines not to continue the EV enlargement mode (that is, to cancel the EV enlargement mode) when the remaining capacity of the battery BAT is less than the hold lower threshold. A value larger than the EV enlargement mode lower threshold described above is set as the hold lower threshold. The hold lower threshold will be described later again.

In the example shown in FIG. 2, since the remaining capacity of the battery BAT at the time t12 is equal to or more than the hold lower threshold, the control device 20 determines to continue the EV enlargement mode. Accordingly, the control device 20 continues the EV enlargement mode even after the time t12 when the engine ENG is operated (that is, the EV traveling mode is ended). In a case where the EV enlargement mode is continued in this way, when the required driving force is less than the EV cancellation output threshold again after the time t12, the control device 20 stops the operation of the engine ENG and causes the vehicle 10 to travel in the EV traveling mode again (see time t13).

When the control mode is the EV enlargement mode and the vehicle 10 is traveling in the EV traveling mode, if the required driving force does not exceed the EV cancellation output threshold, the control device 20 causes the vehicle 10 to travel in the EV traveling mode and maintains the setting of the EV enlargement mode until the remaining capacity of the battery BAT is less than the EV enlargement mode lower threshold (refer to a period from time t13 to time t14).

Further, when the remaining capacity of the battery BAT is less than the EV enlargement mode lower threshold, the control device 20 operates the engine ENG (that is, ends the EV traveling mode) to switch to the other traveling modes capable of preventing a decrease in the remaining capacity of the battery BAT (refer to time t14). Accordingly, it is possible to avoid an excessive decrease in the remaining capacity of the battery BAT. Here, as an example, it is assumed that the traveling mode is switched to the hybrid traveling mode.

In this way, when the engine ENG is operated due to the remaining capacity of the battery BAT being less than the EV enlargement mode lower threshold, the control device 20 also cancels the EV enlargement mode in accordance with the operation of the engine ENG (that is, the end of the EV traveling mode), and returns the control mode to the normal mode.

As described above, if the remaining capacity of the battery BAT when the engine ENG is operated due to the required driving force exceeding the EV cancellation output threshold is equal to or more than the hold lower threshold, the control device 20 continues the EV enlargement mode thereafter. Accordingly, it is possible to reduce the number of opportunities for the EV enlargement mode to be automatically cancelled, and it is possible to reduce the work of the user to reset to the EV enlargement mode. In the example described above, the EV traveling mode is switched to the hybrid traveling mode at the time t12 or the time t14, but the traveling mode may be switched to the engine traveling mode instead of the hybrid traveling mode.

[Example of Case where EV Enlargement Mode is not Continued]

Figure 3:
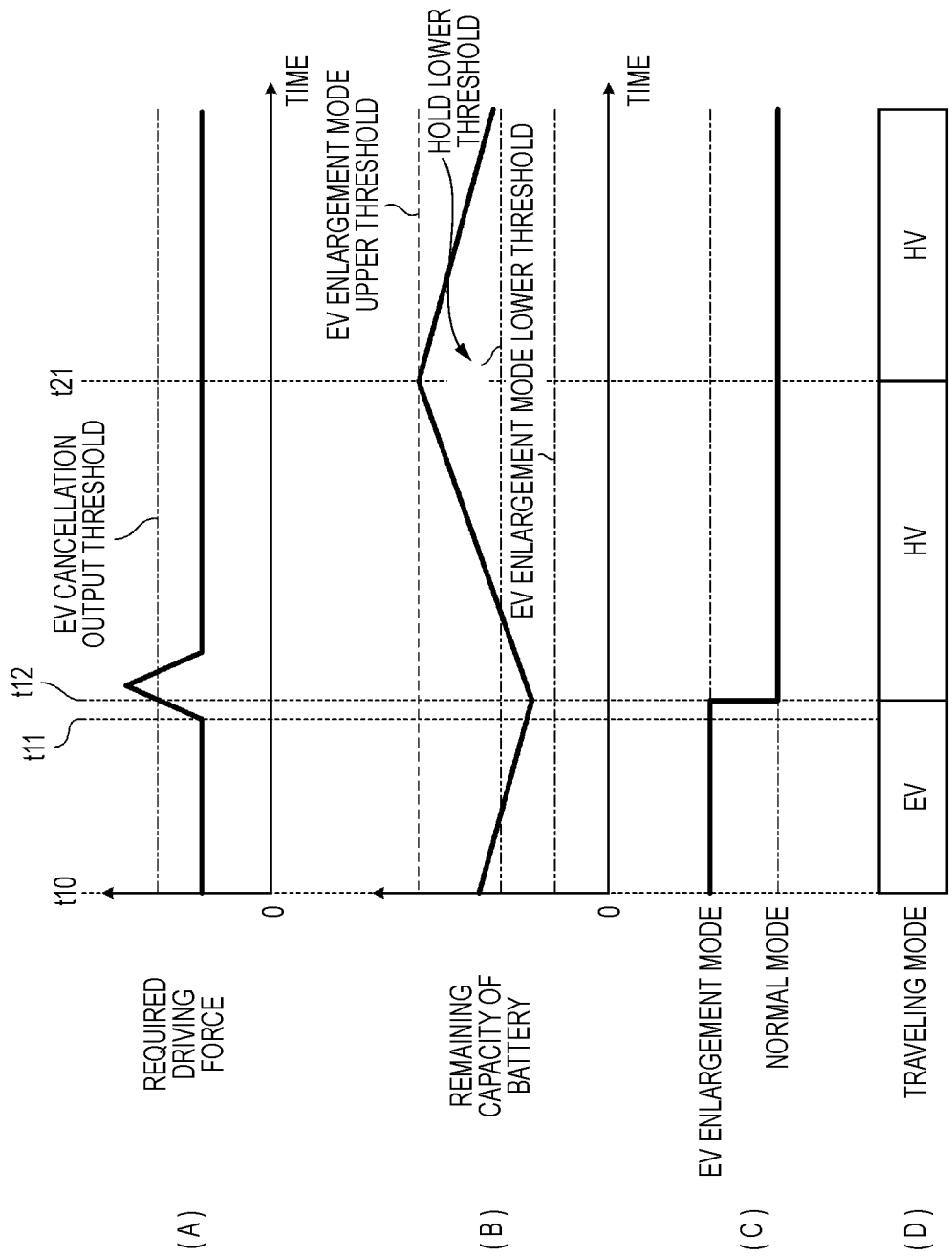
FIG. 3 shows an example of a case where the control device 20 that controls the vehicle 10 does not continue the EV enlargement mode.

Next, an example of a case where the EV enlargement mode is not continued will be described with reference to FIG. 3. The example shown in FIG. 3 is different from the example shown in FIG. 2 in that the remaining capacity of the battery BAT at the time 12 when the engine ENG is operated due to the required driving force exceeding the EV cancellation output threshold is less than the hold lower threshold. In the following description of FIG. 3, portions different from the example shown in FIG. 2 will be mainly described, and description of common portions will be omitted as appropriate.

As shown in FIG. 3, in a case where the remaining capacity of the battery BAT when the engine ENG is operated due to the required driving force exceeding the EV cancellation output threshold is less than the hold lower threshold, the control device 20 determines not to continue the EV enlargement mode. Accordingly, in the example shown in FIG. 3, the control device 20 cancels the EV enlargement mode at the time t12 when the engine ENG is operated (that is, the EV traveling mode is ended).

Further, when the EV enlargement mode is cancelled in this way, the control device 20 charges the battery BAT while causing the vehicle 10 to travel in a traveling mode other than the EV traveling mode (that is, by operating the engine ENG) until the remaining capacity of the battery BAT reaches a predetermined EV enlargement mode upper threshold thereafter (refer to a period from time t12 to time t21 in FIG. 3). The EV enlargement mode upper threshold is larger than the EV enlargement mode lower threshold, and is set in consideration of, for example, the remaining capacity of the battery BAT that can continue traveling in the EV traveling mode for a certain long period of time. Accordingly, the remaining capacity of the battery BAT at the time of starting the next travel in the EV traveling mode can be kept in a state in which the travel in the EV traveling mode can be continued for a certain long period of time, and it is possible to avoid occurrence of an event (hereinafter, also referred to as "engine start busy") in which the engine ENG is started a plurality of times within a short period of time.

Figure 4:
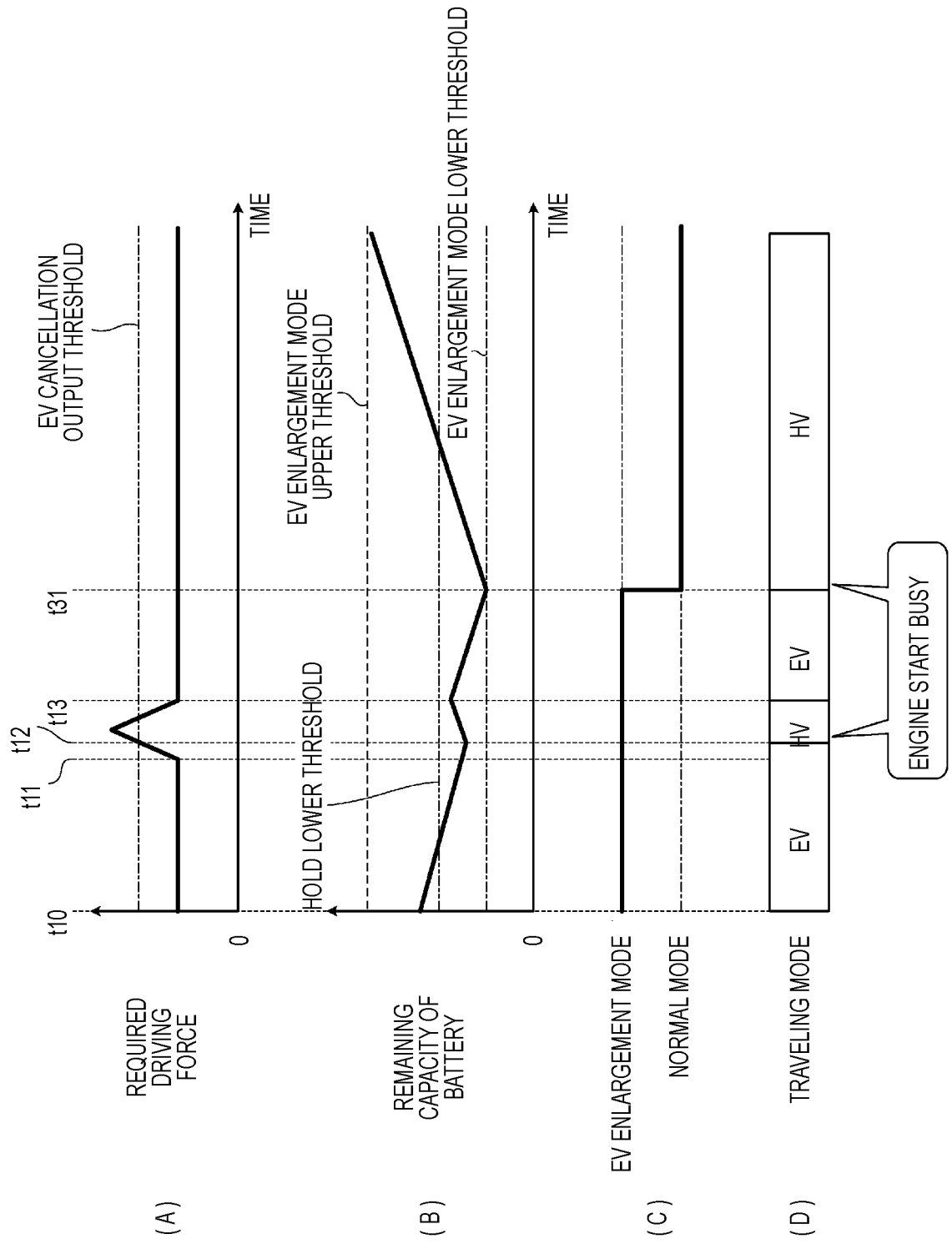
FIG. 4 shows an example of a case where engine start busy occurs.

An example of a case where the engine start busy occurs will be described with reference to FIG. 4. The example shown in FIG. 4 is different from the examples shown in FIGS. 2 and 3 in that the EV enlargement mode is continued even though the remaining capacity of the battery BAT at the time t12 when the engine ENG is operated due to the required driving force exceeding the EV cancellation output threshold is less than the hold lower threshold. In the following description of FIG. 4, portions different from the examples shown in FIGS. 2 and 3 will be mainly described, and description of common portions will be omitted as appropriate.

As shown in FIG. 4, in a case where the EV enlargement mode is continued even though the remaining capacity of the battery BAT at the time t12 is less than the hold lower threshold, when the required driving force is less than the EV cancellation output threshold again thereafter, the control device 20 stops the operation of the engine ENG and causes the vehicle 10 to travel in the EV traveling mode again even though the remaining capacity of the battery BAT decreases (refer to time 113). As a result, after the start of traveling in the EV traveling mode, the remaining capacity of the battery BAT is less than the EV enlargement mode lower threshold within a short period of time, and the engine ENG is operated again (see time t31). Accordingly, the engine start busy occurs.

At the time of starting the engine ENG, noise and vibration are particularly generated. Therefore, when the engine start busy occurs, the marketability of the vehicle 10 may decrease from a viewpoint of noise and vibration (NV) characteristics. Therefore, in the case where the remaining capacity of the battery BAT when the engine ENG is operated due to the required driving force exceeding the EV cancellation output threshold is less than the hold lower threshold, the control device 20 cancels the EV enlargement mode, thereby avoiding the occurrence of the engine start busy and improving the marketability of the vehicle 10.

[Hold Lower Threshold]

Next, the hold lower threshold will be described. The larger the hold lower threshold, the more easily the EV enlargement mode is automatically cancelled, and the smaller the hold lower threshold, the more likely the engine start busy is likely to occur. Since both the frequent cancellation of the EV enlargement mode and the engine start busy may lead to a decrease in the marketability of the vehicle 10, it is desirable to set an appropriate hold lower threshold so as to avoid the frequent cancellation of the EV enlargement mode while avoiding the occurrence of the engine start busy.

Therefore, the control device 20 is configured to be able to change the hold lower threshold based on at least one of the vehicle speed and the road gradient of the road on which the vehicle 10 is traveling. Accordingly, it is possible to set an appropriate hold lower threshold.

Figure 5:
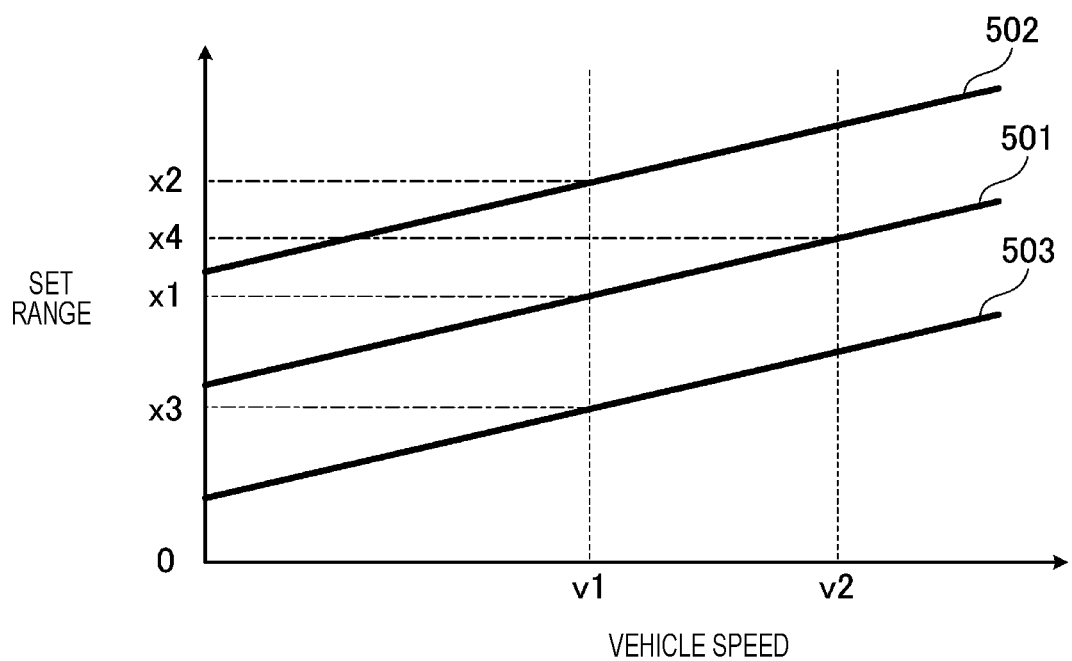
FIG. 5 shows an example of changing a hold lower threshold based on a vehicle speed and a road gradient.

An example of changing the hold lower threshold based on the vehicle speed and the road gradient will be specifically described with reference to FIG. 5. In FIG. 5, a horizontal axis represents a vehicle speed, and a vertical axis represents a set range. Here, the set range is a difference between the hold lower threshold and the EV enlargement mode lower threshold. That is, the smaller the set range, the smaller the hold lower threshold is closer to the EV enlargement mode lower threshold. Conversely, the larger the set range, the larger the hold lower threshold deviates from the EV enlargement mode lower threshold.

In the control device 20, information indicating characteristics 501 to 503 shown in FIG. 5 is stored in advance. A characteristic 501 represents a set range that is set corresponding to each vehicle speed when the road gradient is a first predetermined value (for example, a reference value). A characteristic 502 represents a set range that is set corresponding to each vehicle speed when the road gradient is a second predetermined value larger than the first predetermined value. A characteristic 503 represents a set range that is set corresponding to each vehicle speed when the road gradient is a third predetermined value smaller than the first predetermined value.

For example, when the road gradient of the road on which the vehicle 10 is traveling is the first predetermined value and the vehicle speed is v1, the control device 20 sets a value obtained by adding x1, which is a set range corresponding to the first predetermined value and v1, to the EV enlargement mode lower threshold as the hold lower threshold. Further, when the road gradient of the road on which the vehicle 10 is traveling is the second predetermined value and the vehicle speed is v1, the control device 20 sets a value obtained by adding x2, which is a set range corresponding to the second predetermined value and v1, to the EV enlargement mode lower threshold as the hold lower threshold. Here, x2 is larger than x1. Therefore, the hold lower threshold set when the vehicle speed is v1 and the road gradient is the second predetermined value is larger than the hold lower threshold set when the vehicle speed is v1 and the road gradient is the first predetermined value.

Further, when the road gradient of the road on which the vehicle 10 is traveling is the third predetermined value and the vehicle speed is v1, the control device 20 sets a value obtained by adding x3, which is a set range corresponding to the third predetermined value and v1, to the EV enlargement mode lower threshold as the hold lower threshold. Here, x3 is smaller than x1. Therefore, the hold lower threshold set when the vehicle speed is v1 and the road gradient is the third predetermined value is smaller than the hold lower threshold set when the vehicle speed is v1 and the road gradient is the first predetermined value.

That is, since travel resistance increases as the road gradient increases, the remaining capacity of the battery BAT rapidly decreases when the vehicle 10 travels in the EV traveling mode. Therefore, if the same hold lower threshold as that when the road gradient is small (that is, when the travel resistance is small) is also used when the road gradient is large, the engine start busy is likely to occur. Therefore, the control device 20 can prevent the occurrence of the engine start busy by increasing the hold lower threshold as the road gradient increases.

Conversely, since the travel resistance decreases as the road gradient decreases, the remaining capacity of the battery BAT slowly decreases when the vehicle 10 travels in the EV traveling mode. Therefore, when the road gradient is small, the engine start busy is less likely to occur even if the hold lower threshold is reduced to some extent. Therefore, the control device 20 can make it difficult for the EV enlargement mode to be automatically cancelled while avoiding the occurrence of the engine start busy by decreasing the hold lower threshold as the road gradient decreases.

When the road gradient of the road on which the vehicle 10 is traveling is the first predetermined value and the vehicle speed is v2 greater than v1, the control device 20 sets a value obtained by adding x4, which is a set range corresponding to the first predetermined value and v2, to the EV enlargement mode lower threshold as the hold lower threshold. Here, x4 is larger than x1. Therefore, the hold lower threshold set when the road gradient is the first predetermined value and the vehicle speed is v2 is larger than the hold lower threshold set when the road gradient is the first predetermined value and the vehicle speed is v1.

That is, even when the vehicle speed increases, the travel resistance increases as in the case where the road gradient increases. Conversely, when the vehicle speed decreases, the travel resistance also decreases. Therefore, the control device 20 can prevent the occurrence of the engine start busy by increasing the hold lower threshold as the vehicle speed increases. Further, the control device 20 can make it difficult for the EV enlargement mode to be automatically cancelled while avoiding the occurrence of the engine start busy by decreasing the hold lower threshold as the vehicle speed decreases.

The control device 20 can acquire information indicating a road gradient of a road on which the vehicle 10 is traveling from, for example, the navigation device 13. The present disclosure is not limited thereto, and the control device 20 may acquire information indicating a road gradient of a road on which the vehicle 10 is traveling using any method.

The control device 20 may determine whether recovery of the remaining capacity of the battery BAT can be expected when the vehicle 10 travels on the scheduled traveling route, based on the scheduled traveling route of the vehicle 10. When it is determined that the recovery of the remaining capacity of the battery BAT can be expected, the control device 20 may set the hold lower threshold to be smaller than that when it is determined that the recovery of the remaining capacity of the battery BAT cannot be expected.

Here, the determination as to whether the recovery of the remaining capacity of the battery BAT can be expected may be, for example, a determination as to whether a section in which the first motor generator MG1 can perform the regenerative operation (hereinafter, also referred to as a "regeneration section") is included in the scheduled traveling route of the vehicle 10. An example of the regeneration section is a downhill where an altitude at an end point, which is an end on a side farther from the vehicle 10, is lower than an altitude at a start point, which is an end on a side close to the vehicle 10.

An example of changing the hold lower threshold based on the scheduled traveling route of the vehicle 10 will be specifically described with reference to FIG. 6. In FIG. 6A, a horizontal axis represents time, and a vertical axis represents an altitude. In FIG. 6B, a horizontal axis represents time, and a vertical axis represents a set range.

Figure 6:
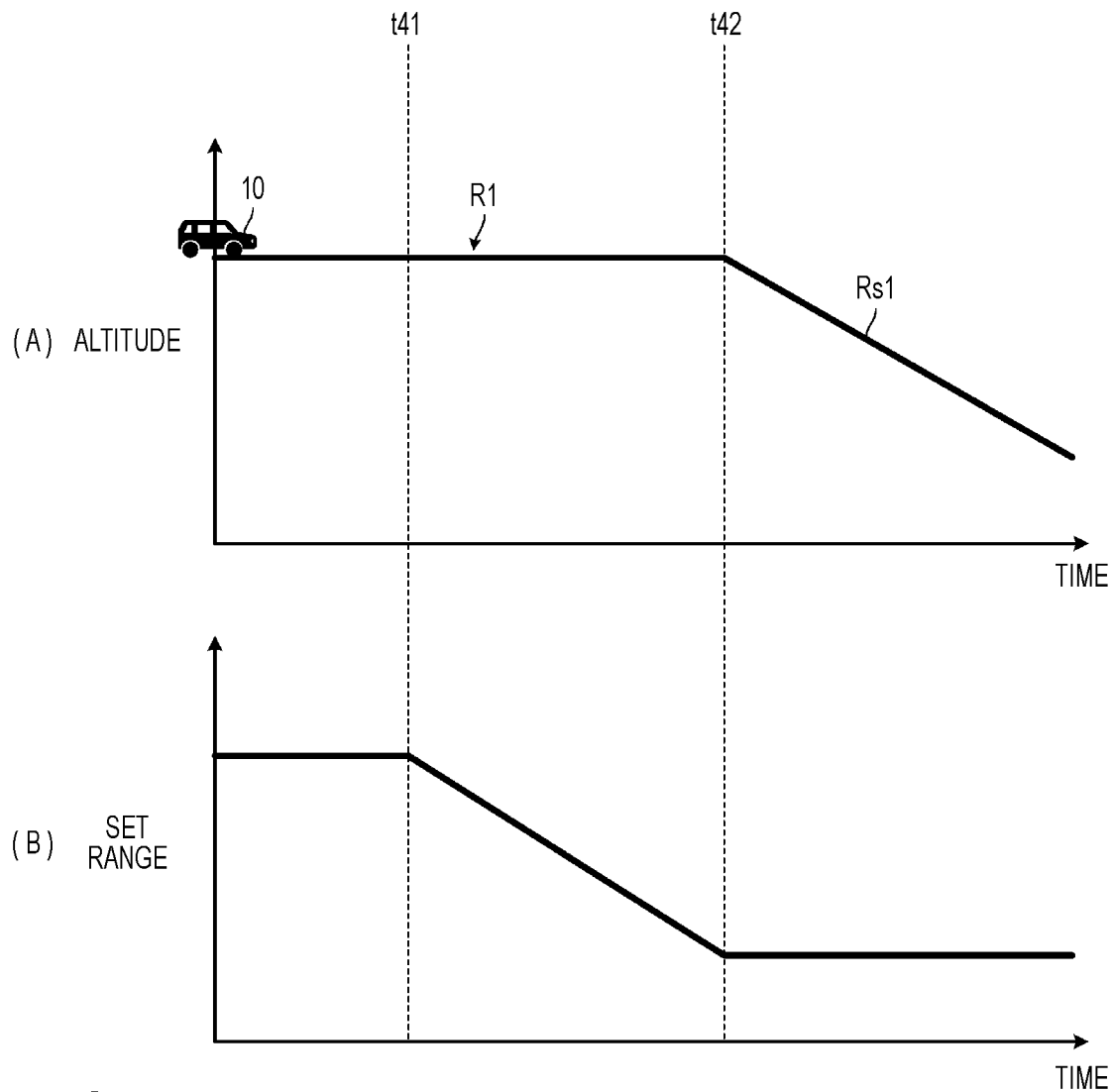
FIG. 6 shows an example of changing a hold lower threshold based on a scheduled traveling route.

In the example shown in FIG. 6, the vehicle 10 travels on a route R1. The route R1 is a route predicted as a scheduled traveling route of the vehicle 10, and includes a regeneration section Rs1. In this case, the control device 20 decreases the set range at a predetermined decrease rate from time t41, which is a predetermined timing before the vehicle 10 reaches the start point of the regeneration section Rs1. Accordingly, the hold lower threshold also decreases at the predetermined decrease rate. The timing t41 may be, for example, a timing when the vehicle 10 reaches a point a predetermined distance before the start point of the regeneration section Rs1. Then, at time t42, which is a timing when the vehicle 10 reaches the start point of the regeneration section Rs1, the control device 20 controls the set range such that the hold lower threshold is a predetermined minimum value.

In this way, when the recovery of the remaining capacity of the battery BAT can be expected from the scheduled traveling route of the vehicle 10, the control device 20 can easily continue the EV enlargement mode by decreasing the hold lower threshold, and thus can increase the traveling frequency in the EV traveling mode. Accordingly, it is possible to reduce opportunities to operate the engine ENG, improve fuel efficiency performance of the vehicle 10, and prevent deterioration of NV characteristics due to the operation of the engine ENG. Further, before the vehicle 10 reaches the regeneration section, by increasing the traveling frequency in the EV traveling mode and reducing the remaining capacity of the battery BAT, it is possible to recover more regenerative electric power generated in the regeneration section and effectively use the regenerative electric power.

[Display Example of Remaining Capacity Information]

As described above, in the vehicle 10, the remaining capacity of the battery BAT when the EV enlargement mode is cancelled is not constant. That is, the remaining capacity when the EV enlargement mode is cancelled may be a remaining capacity immediately after the remaining capacity is less than the EV enlargement mode lower threshold, or may be a remaining capacity that is equal to or more than the EV enlargement mode lower threshold and less than the hold lower threshold. However, even if the remaining capacity of the battery BAT varies when the EV enlargement mode is cancelled in this way, if a display mode of the remaining capacity information also varies when the EV enlargement mode is cancelled, the user may be confused or a sense of discomfort may be given to the user.

Therefore, the control device 20 equalizes a display mode of the remaining capacity information when the EV enlargement mode is cancelled by the required driving force being equal to or larger than the EV cancellation output threshold and the remaining capacity of the battery BAT being less than the hold lower threshold in a case where the vehicle 10 is caused to travel in the EV traveling mode, and a display mode of the remaining capacity information when the EV enlargement mode is cancelled by the remaining capacity of the battery BAT being less than the EV enlargement mode lower threshold in the case where the vehicle 10 is caused to travel in the EV traveling mode.

Figure 7:
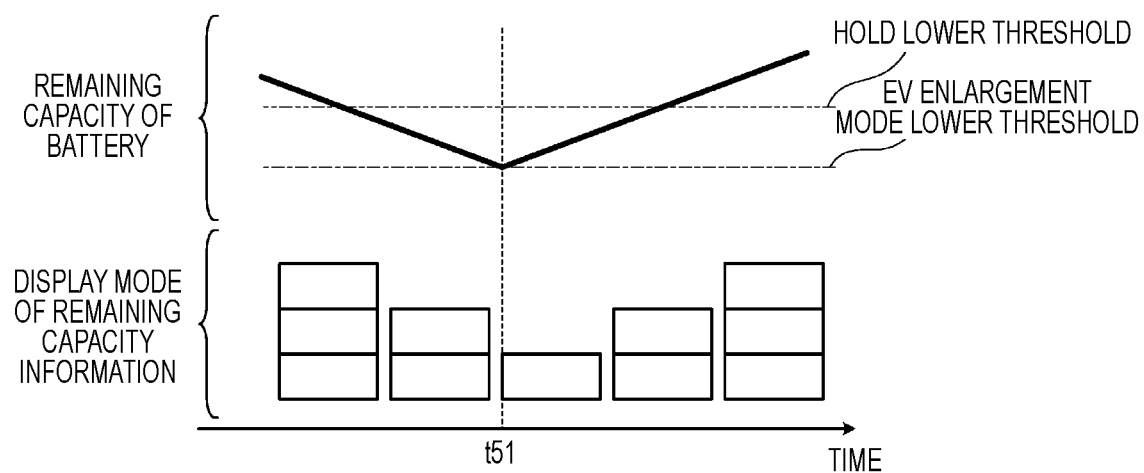
FIG. 7 shows an example of a display mode of remaining capacity information when the EV enlargement mode is cancelled by making a remaining capacity of a battery BAT less than an EV enlargement mode lower threshold.

For example, as shown at time t51 in FIG. 7, when the EV enlargement mode is cancelled by the remaining capacity of the battery BAT being less than the EV enlargement mode lower threshold in the case where the vehicle 10 is caused to travel in the EV traveling mode, the control device 20 displays the remaining capacity information so as to indicate "1 (for example, 1 out of 10 stages)".

Figure 8:
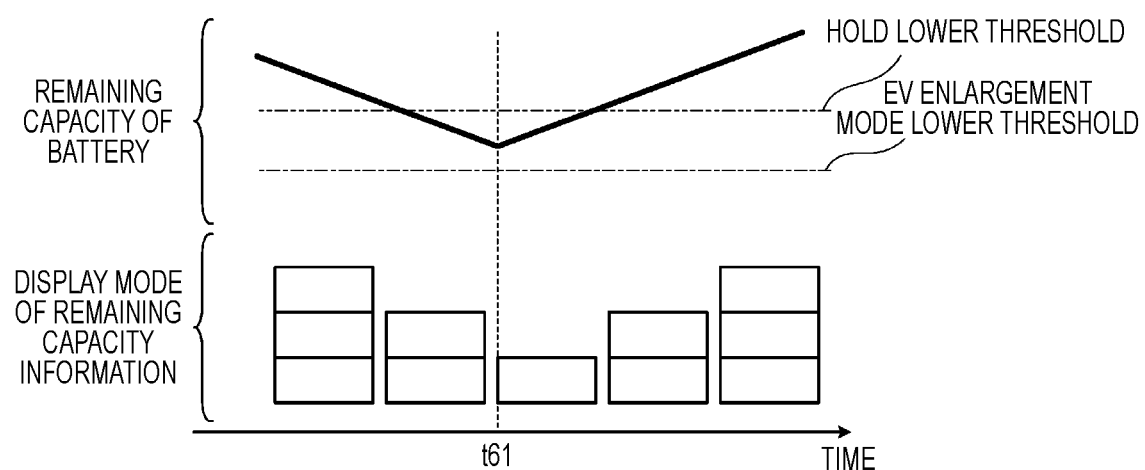
FIG. 8 shows an example of a display mode of remaining capacity information when the EV enlargement mode is cancelled by making a required driving force equal to or larger than an EV cancellation output threshold and making the remaining capacity of the battery BAT less than the hold lower threshold.

As shown at time t61 in FIG. 8, when the EV enlargement mode is cancelled by the required driving force being equal to or larger than the EV cancellation output threshold and the remaining capacity of the battery BAT being less than the hold lower threshold in the case where the vehicle 10 is caused to travel in the EV traveling mode, the control device 20 also displays the remaining capacity information so as to indicate "1".

That is, immediately before the time t61, since the remaining capacity of the battery BAT is more than the EV enlargement mode lower threshold, the remaining capacity information may indicate, for example, "2 (for example, 2 out of 10 stages)". In such a case, the control device 20 changes the remaining capacity information to the remaining capacity information indicating "1" at time t61, and then operates the engine ENG and cancels the EV enlargement mode. Accordingly, it is possible to avoid confusion of the user or giving a sense of discomfort to the user due to variations in the display mode of the remaining capacity information when the EV enlargement mode is cancelled.

As described above, the control device 20 can set the EV enlargement mode, in which the traveling frequency in the EV traveling mode is increased, in response to a request from the user of the vehicle 10. When the EV enlargement mode is set, the required driving force is less than the predetermined EV cancellation output threshold, and the remaining capacity of the battery BAT is equal to or more than the predetermined EV enlargement mode lower threshold, the control device 20 causes the vehicle 10 to travel in the EV traveling mode. In a case where the required driving force is equal to or larger than the EV cancellation output threshold when the EV enlargement mode is set and the vehicle 10 is caused to travel in the EV traveling mode, the control device 20 operates the engine ENG to cause the vehicle to travel in the other traveling mode (for example, the hybrid traveling mode). Further, the control device 20 continues the EV enlargement mode if the remaining capacity of the battery BAT when the required driving force is equal to or larger than the EV cancellation output threshold is equal to or more than the hold lower threshold that is larger than the EV enlargement mode lower threshold. Further, if the remaining capacity of the battery BAT when the required driving force is equal to or larger than the EV cancellation output threshold is less than the hold lower threshold, the control device 20 cancels the EV enlargement mode. Accordingly, it is possible to appropriately continue the EV enlargement mode and improve the marketability of the vehicle 10.

The present disclosure is not limited to the embodiment described above, and modifications, improvements, or the like can be made as appropriate. For example, in the embodiment described above, the example in which the control device 20 changes the hold lower threshold based on both the vehicle speed and the road gradient has been described, but the present disclosure is not limited thereto. The control device 20 may be configured to change the hold lower threshold based on only one of the vehicle speed and the road gradient.

At least following matters are described in the present specification. Although corresponding components and the like in the embodiment described above are shown in parentheses, the present disclosure is not limited thereto.

(1) A vehicle control device (control device 20), in which the vehicle control device is configured to control a vehicle (vehicle 10) including an internal combustion engine (engine ENG), a power storage device (battery BAT), an electric motor (first motor generator MG1) that performs driving according to supply of electric power from at least the power storage device, and a drive wheel (drive wheel DW) that is driven by at least one of the internal combustion engine and the electric motor, in which the vehicle has a first traveling mode in which the vehicle travels by stopping an operation of the internal combustion engine and driving the drive wheel by the electric motor according to supply of electric power from the power storage device, and a second traveling mode in which the vehicle travels by operating the internal combustion engine, the vehicle control device is configured to
set an enlargement mode for increasing a traveling frequency in the first traveling mode in response to a request from a user of the vehicle,
cause the vehicle to travel in the first traveling mode under a condition that the enlargement mode is set, a required driving force required for traveling of the vehicle is smaller than a predetermined value (EV cancellation output threshold), and a remaining capacity of the power storage device is equal to or more than a predetermined enlargement mode lower threshold (EV enlargement mode lower threshold), operate the internal combustion engine to cause the vehicle to travel in the second traveling mode in response to the required driving force becoming equal to or larger than the predetermined value under a condition that the enlargement mode is set and the vehicle is caused to travel in the first traveling mode, and continue the enlargement mode under a condition that the remaining capacity when the required driving force becomes equal to or larger than the predetermined value is equal to or more than a predetermined hold lower threshold, and cancel the enlargement mode under a condition that the remaining capacity is less than the hold lower threshold, and the hold lower threshold is larger than the enlargement mode lower threshold.

According to (1), when the enlargement mode is set and the vehicle is caused to travel in the first traveling mode, the enlargement mode can be continued if the remaining capacity of the power storage device when the required driving force is equal to or larger than the predetermined value is equal to or more than the hold lower threshold that is larger than the enlargement mode lower threshold, and the enlargement mode can be cancelled if the remaining capacity is less than the hold lower threshold. Accordingly, it is possible to appropriately continue the enlargement mode and improve the marketability of the vehicle.

(2) The vehicle control device according to (1), in which
the vehicle control device is configured to change the hold lower threshold based on a traveling speed of the vehicle, and the hold lower threshold at a time when the traveling speed is high is set to be smaller than the hold lower threshold at a time when the traveling speed is low.

According to (2), since the hold lower threshold is set to be smaller when the traveling speed is low than when the traveling speed is high, it is possible to avoid occurrence of an engine start busy, which is an event in which the internal combustion engine is started a plurality of times within a short period of time, and to make it difficult for the enlargement mode to be automatically cancelled against an intention of the user.

(3) The vehicle control device according to (1) or (2), in which
the vehicle control device is configured to change the hold lower threshold based on a road gradient of a road on which the vehicle is traveling, and the hold lower threshold at a time when the road gradient is small is set to be smaller than the hold lower threshold at a time when the road gradient is large.

According to (3), since the hold lower threshold is set to be smaller when the road gradient is small than when the road gradient is large, it is possible to avoid occurrence of an engine start busy, which is an event in which the internal combustion engine is started a plurality of times within a short period of time, and to make it difficult for the enlargement mode to be automatically cancelled against an intention of the user.

(4) The vehicle control device according to (1), in which
the vehicle control device is configured to change the hold lower threshold based on a scheduled traveling route of the vehicle, and the hold lower threshold at a time when determining that recovery of the remaining capacity is to be expected is set to be smaller than the hold lower threshold at a time when determining that the recovery of the remaining capacity is not to be expected.

According to (4), when the recovery of the remaining capacity of the power storage device can be expected from the scheduled traveling route of the vehicle, the hold lower threshold is set to be smaller than when the recovery of the remaining capacity of the power storage device cannot expected, so that the enlargement mode is easily continued, and the traveling frequency in the first traveling mode can be increased. Accordingly, it is possible to reduce opportunities to operate the internal combustion engine, improve fuel efficiency of the vehicle, and prevent deterioration of noise and vibration (NV) characteristics due to the operation of the internal combustion engine.

(5) The vehicle control device according to any one of (1) to (4), in which
the vehicle control device is configured to operate the internal combustion engine to cause the vehicle to travel in the second traveling mode and cancel the enlargement mode, in response to the remaining capacity becoming less than the enlargement mode lower threshold under the condition that the enlargement mode is set and the vehicle is caused to travel in the first traveling mode.

According to (5), since the vehicle control device is configured to operate the internal combustion engine to cause the vehicle to travel in the second traveling mode and cancel the enlargement mode in a case where the remaining capacity of the power storage device is less than the enlargement mode lower threshold when the enlargement mode is set and the vehicle is caused to travel in the first traveling mode, it is possible to prevent the remaining capacity of the power storage device from excessively decreasing.

(6) The vehicle control device according to (5), in which
the vehicle includes a display device (display device 14) configured to display remaining capacity information indicating the remaining capacity, and the vehicle control device equalizes
a display mode of the remaining capacity information of the display device at a time when the enlargement mode is cancelled by the required driving force becoming equal to or larger than the predetermined value and the remaining capacity being less than the hold lower threshold during the vehicle traveling in the first traveling mode and a display mode of the remaining capacity information of the display device at a time when the enlargement mode is cancelled by the remaining capacity becoming less than the enlargement mode lower threshold during the vehicle traveling in the first traveling mode.

According to (6), it is possible to avoid confusion of the user or giving a sense of discomfort to the user due to variations in the display mode of the remaining capacity information when the enlargement mode is cancelled.

(7) The vehicle control device according to any one of (1) to (6), in which
the vehicle further includes a generator (second motor generator MG2) driven by the internal combustion engine to generate electric power and configured to supply the generated electric power to the electric motor, and the second traveling mode is a traveling mode in which the vehicle travels by the electric motor driving the drive wheel according to supply of electric power from at least the generator.

According to (7), even if the remaining capacity of the power storage device decreases, it is possible to drive the generator by the internal combustion engine and drive the electric motor by the electric power generated by the generator to cause the vehicle to travel.

The invention claimed is:

1. A vehicle control device, wherein
the vehicle control device is configured to control a vehicle comprising an internal combustion engine, a power storage device, an electric motor that performs driving according to supply of electric power from at least the power storage device, and a drive wheel that is driven by at least one of the internal combustion engine and the electric motor,
the vehicle has a first traveling mode in which the vehicle travels by stopping an operation of the internal combustion engine and driving the drive wheel by the electric motor according to supply of electric power from the power storage device, and a second traveling mode in which the vehicle travels by operating the internal combustion engine,
the vehicle control device is configured to
set an enlargement mode for increasing a traveling frequency in the first traveling mode in response to a request from a user of the vehicle,
cause the vehicle to travel in the first traveling mode under a condition that the enlargement mode is set, a required driving force required for traveling of the vehicle is smaller than a predetermined value, and a remaining capacity of the power storage device is equal to or more than a predetermined enlargement mode lower threshold,
operate the internal combustion engine to cause the vehicle to travel in the second traveling mode in response to the required driving force becoming equal to or larger than the predetermined value under a condition that the enlargement mode is set and the vehicle is caused to travel in the first traveling mode, and
continue the enlargement mode under a condition that the remaining capacity at a time when the required driving force becomes equal to or larger than the predetermined value is equal to or more than a predetermined hold lower threshold, and cancel the enlargement mode under a condition that the remaining capacity is less than the hold lower threshold, and
the hold lower threshold is larger than the enlargement mode lower threshold.

2. The vehicle control device according to claim 1, wherein
the vehicle control device is configured to change the hold lower threshold based on a traveling speed of the vehicle, and
the hold lower threshold at a time when the traveling speed is high is set to be smaller than the hold lower threshold at a time when the traveling speed is low.

3. The vehicle control device according to claim 1, wherein
the vehicle control device is configured to change the hold lower threshold based on a road gradient of a road on which the vehicle is traveling, and
the hold lower threshold at a time when the road gradient is small is set to be smaller than the hold lower threshold at a time when the road gradient is large.

4. The vehicle control device according to claim 1, wherein
the vehicle control device is configured to change the hold lower threshold based on a scheduled traveling route of the vehicle, and
the hold lower threshold at a time when determining that recovery of the remaining capacity is to be expected is set to be smaller than the hold lower threshold at a time when determining that the recovery of the remaining capacity is not to be expected.

5. The vehicle control device according to claim 1, wherein
the vehicle control device is configured to operate the internal combustion engine to cause the vehicle to travel in the second traveling mode and cancel the enlargement mode, in response to the remaining capacity becoming less than the enlargement mode lower threshold under the condition that the enlargement mode is set and the vehicle is caused to travel in the first traveling mode.

6. The vehicle control device according to claim 5, wherein
the vehicle includes a display device configured to display remaining capacity information indicating the remaining capacity, and
the vehicle control device equalizes
a display mode of the remaining capacity information of the display device at a time when the enlargement mode is cancelled by the required driving force becoming equal to or larger than the predetermined value and the remaining capacity being less than the hold lower threshold during the vehicle traveling in the first traveling mode and
a display mode of the remaining capacity information of the display device at a time when the enlargement mode is cancelled by the remaining capacity becoming less than the enlargement mode lower threshold during the vehicle traveling in the first traveling mode.

7. The vehicle control device according to claim 1, wherein
the vehicle further includes a generator driven by the internal combustion engine to generate electric power and configured to supply the generated electric power to the electric motor, and
the second traveling mode is a traveling mode in which the vehicle travels by the electric motor driving the drive wheel according to supply of electric power from at least the generator.

* * * * *